M. C. CROOK.
ARTIFICIAL CHRISTMAS TREE.
APPLICATION FILED FEB. 13, 1911.
994,248.
Patented June 6, 1911.
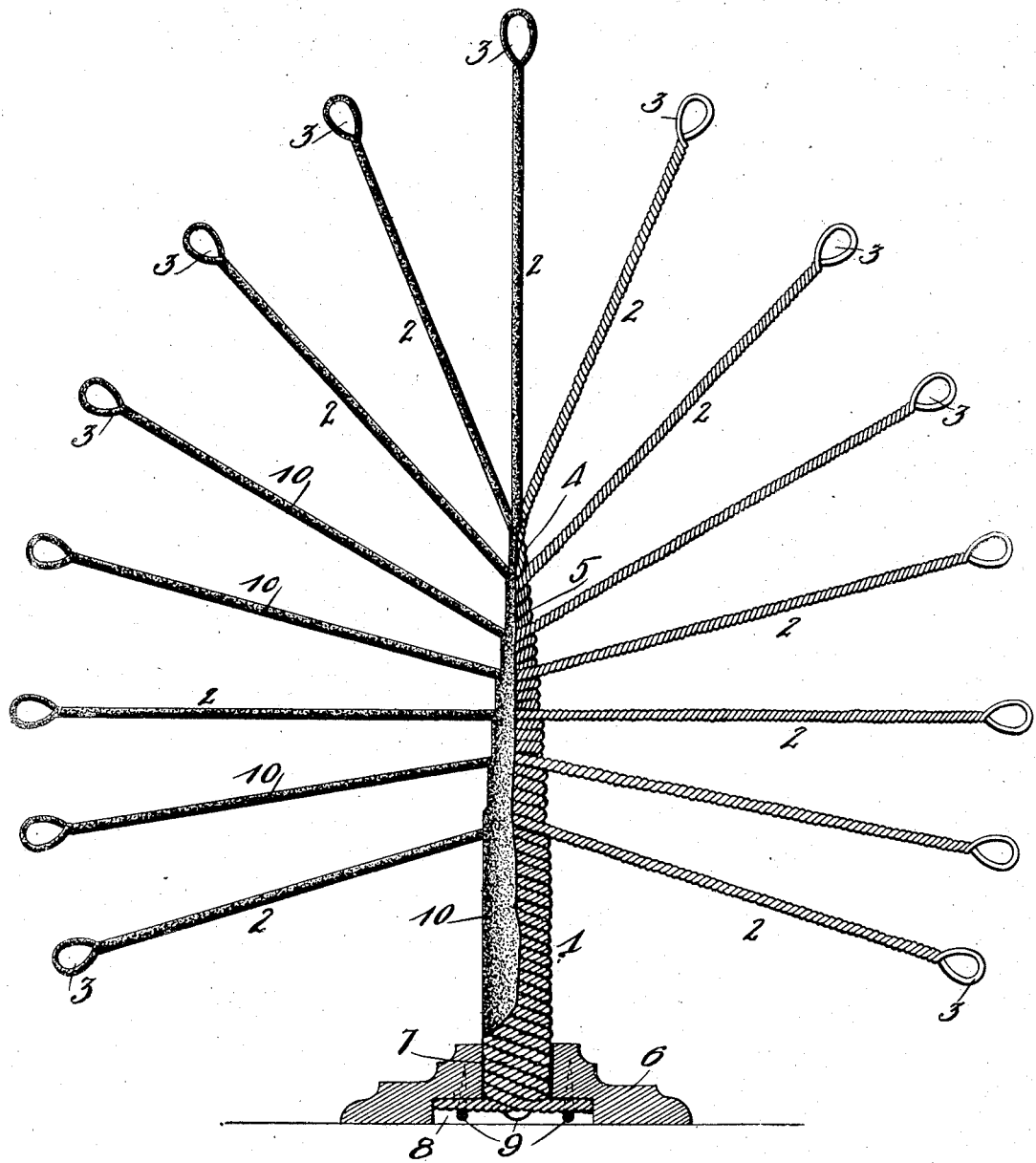
Witnesses
J. R. Pierce
O. B. Hopkins
Inventor
M. C. Crook.
by H. B. Willson & Co.
Attorneys

UNITED STATES PATENT OFFICE.

MARY C. CROOK, OF FALLS CITY, NEBRASKA.

ARTIFICIAL CHRISTMAS TREE.

994,248.  Specification of Letters Patent.  Patented June 6, 1911.

Application filed February 13, 1911. Serial No. 608,420.

*To all whom it may concern:*

Be it known that I, MARY C. CROOK, a citizen of the United States, residing at Falls City, in the county of Richardson and State of Nebraska, have invented certain new and useful Improvements in Artificial Christmas Trees; and I do declare the following to be a full, clear, and exact description of the invention, such as will enable others skilled in the art to which it appertains to make and use the same.

This invention relates to improvements in artificial Christmas trees.

One object of the invention is to provide a Christmas three of this character having its trunk and branches formed of suitably twisted wires which are covered and arranged to simulate the branches of a natural tree.

Another object is to construct a tree of this character which will be strong, durable, inexpensive and fireproof in construction, attractive in appearance and well adapted to the purpose for which it is designed.

With the above and other objects in view, the invention consists of certain novel features of construction, combination and arrangement of parts as will be more fully described and particularly pointed out in the appended claims.

In the accompanying drawings is shown a side view partly in section of my improved tree, a portion of which is shown in an unfinished state to illustrate the construction of the parts.

My improved tree comprises a trunk 1 and a series of branches 2, said branches being formed of a series of wire rods bent upon themselves midway between their ends to form open loops 3, said ends of the wires after forming the loops being closely twisted together as shown. After thus being formed the central branches of the tree have their inner ends twisted together to form the central portion or core 4 of the trunk. The upper branches next to the central group are secured to the trunk by having their inner portions wound spirally around the core 4 as shown at 5. The next branches are secured to the trunk by having their inner ends wound around the wound ends of the preceding branches until the desired number of branches have been arranged to form the tree. The inner portions of the branches when wound upon each other in the manner described form the trunk 1 of the tree which gradually increases in size toward its lower end as shown.

The lower end of the tree is preferably secured in a suitable supporting base 6, said base having a centrally disposed passage 7 to receive the lower end of the trunk and has formed in its lower side a recess 8 into which the ends of the branches forming the trunk are bent and fastened by staples or other fastening devices 9. In order to more closely imitate the trunk of a tree the wire forming the trunk and branches is preferably covered with a suitable coating 10 of metallic or other fireproof material which may be of any desired tint or color to imitate the bark on the trunk and limbs of the tree. By forming the loops 3 on the outer ends of the branches, candles, tree ornaments or other objects may be secured to or suspended from said ends of the branches.

An artificial Christmas tree constructed in accordance with my invention can be readily substituted for and will serve all the purposes of a natural Christmas tree and will possess an advantage over the natural tree in that my artificial tree is absolutely fireproof.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. An artificial Christmas tree comprising a plurality of branches each of which is formed from a wire rod bent midway between its ends to form a loop and having its ends twisted together to form the body of the branches, said branches having their inner ends twisted together and wound upon each other to form the trunk of the tree, a base having formed therein a central aperture and having in its lower side a recess adapted to receive the lower end of the tree trunk and the radially projecting ends of the branches forming the trunk, and means to secure said ends of the branches in said recess.

2. An artificial Christmas tree comprising a plurality of branches each of which is formed from a wire rod bent midway between its ends to form a loop and having its ends twisted together to form the body of the branches, said branches having their inner ends twisted together and wound upon each other to form the trunk of the tree, a base having formed therein a central aperture and having in its lower side a recess adapted to receive the lower end of the tree trunk and the radially projecting ends of the branches forming the trunk, means to secure said ends of the branches in said recess, and a fireproof coating arranged over said branches and trunk to simulate the bark of a tree.

In testimony whereof I have hereunto set my hand in presence of two subscribing witnesses.

MARY C. CROOK.

Witnesses:
 J. E. LEYDA,
 W. A. GREENWALD.